United States Patent
Affeldt et al.

(10) Patent No.: US 11,583,890 B2
(45) Date of Patent: Feb. 21, 2023

(54) LOW TEMPERATURE CURING 1K BASECOAT AND METHOD TO COAT A SUBSTRATE WITH THE 1K BASECOAT

(71) Applicant: BASF Coatings GmbH, Münster (DE)

(72) Inventors: Douglas Michael Affeldt, Southfield, MI (US); Brian W McDermott, Southfield, MI (US); Timothy S December, Southfield, MI (US); Donald H Campbell, Southfield, MI (US)

(73) Assignee: BASF COATINGS GMBH, Münster (DE)

( * ) Notice: Subject to any disclaimer, the term of this patent is extended or adjusted under 35 U.S.C. 154(b) by 138 days.

(21) Appl. No.: 16/618,846

(22) PCT Filed: Jul. 3, 2018

(86) PCT No.: PCT/EP2018/067978
§ 371 (c)(1),
(2) Date: Dec. 3, 2019

(87) PCT Pub. No.: WO2019/015953
PCT Pub. Date: Jan. 24, 2019

(65) Prior Publication Data
US 2021/0291224 A1    Sep. 23, 2021

(30) Foreign Application Priority Data
Jul. 18, 2017 (EP) .................................... 17181852

(51) Int. Cl.
| | |
|---|---|
| B05D 7/00 | (2006.01) |
| C08G 18/10 | (2006.01) |
| C08G 18/32 | (2006.01) |
| C08G 18/62 | (2006.01) |
| C08K 5/3492 | (2006.01) |
| C08L 61/32 | (2006.01) |

(52) U.S. Cl.
CPC .............. B05D 7/532 (2013.01); B05D 7/52 (2013.01); B05D 7/57 (2013.01); B05D 7/577 (2013.01); C08G 18/10 (2013.01); C08G 18/3246 (2013.01); C08G 18/6225 (2013.01); C08K 5/34922 (2013.01); C08L 61/32 (2013.01)

(58) Field of Classification Search
CPC . B05D 7/532; B05D 7/52; B05D 7/57; B05D 7/577
See application file for complete search history.

(56) References Cited

U.S. PATENT DOCUMENTS

| | | | |
|---|---|---|---|
| 3,403,088 A | 9/1968 | Hart | |
| 4,939,216 A * | 7/1990 | Lawrenz | C08G 18/833 524/901 |
| 5,100,735 A | 3/1992 | Chang | |
| 5,227,422 A | 7/1993 | Mitsuji et al. | |
| 5,502,101 A * | 3/1996 | Schwarte | B05D 7/532 427/372.2 |
| 5,721,018 A * | 2/1998 | Goldner | B05D 5/068 427/407.1 |
| 5,939,195 A * | 8/1999 | Allen | B05D 7/534 428/413 |
| 6,001,915 A | 12/1999 | Schwarte et al. | |
| 6,054,508 A * | 4/2000 | Watanabe | C08F 8/44 427/410 |
| 6,420,472 B1 | 7/2002 | Rehfuss et al. | |
| 6,696,535 B2 | 2/2004 | Campbell et al. | |
| 6,855,789 B2 | 2/2005 | Campbell et al. | |
| 10,196,528 B2 | 2/2019 | Steinmetz et al. | |
| 10,363,572 B2 | 7/2019 | Bauer et al. | |
| 2014/0287152 A1* | 9/2014 | Enkisch-Krug | B05D 3/007 427/470 |
| 2018/0030310 A1 | 2/2018 | December et al. | |
| 2018/0030311 A1 | 2/2018 | December et al. | |

FOREIGN PATENT DOCUMENTS

| | | |
|---|---|---|
| CA | 916826 A | 12/1972 |
| CN | 106061628 A | 10/2016 |
| DE | 2144135 A1 | 3/1972 |
| EP | 2862909 A1 | 4/2015 |
| GB | 733568 A * | 7/1955 |
| JP | H04103680 A | 4/1992 |
| WO | 2016177515 A1 | 11/2016 |

OTHER PUBLICATIONS

International Search Report for International Application No. PCT/EP2018/067978, dated Oct. 9, 2018, 4 pages.
Written Opinion of International Searching Authority for International Application No. PCT/EP2018/067978, dated Oct. 9, 2018, 9 pages.
European Search Report for EP Patent Application No. 17181852.9, dated Jan. 17, 2018, 3 pages.

* cited by examiner

*Primary Examiner* — Michael L Leonard
(74) *Attorney, Agent, or Firm* — Armstrong Teasdale LLP

(57) ABSTRACT

A storage stable one component aqueous basecoat composition containing a melamine formaldehyde crosslinker and a resin having groups reactive to the melamine formaldehyde crosslinker under acid catalysis is provided. The basecoat composition is curable at a temperature of 110° C. or less when cured wet on wet with a solvent borne clear coat composition containing a polyisocyanate crosslinker. Also provided is a wet on wet two layer coating containing the one component aqueous basecoat and the solvent borne clear coat, a wet on wet three layer coating containing an aqueous primer, the one component aqueous basecoat and the solvent borne clear coat and a cured topcoat coating obtained by curing the wet on wet two layer coating.

4 Claims, No Drawings

LOW TEMPERATURE CURING 1K BASECOAT AND METHOD TO COAT A SUBSTRATE WITH THE 1K BASECOAT

CROSS-REFERENCE TO RELATED APPLICATIONS

This application is a U.S. National Phase Application of PCT/EP2018/067978, filed Jul. 3, 2018, which claims the benefit of priority to EP Application No. 17181852.9, filed Jul. 18, 2017, the contents of which are hereby expressly incorporated by reference in their entirety.

BACKGROUND

The present invention relates to low temperature cure coating compositions, low temperature cure composite coatings that are formed by a double layer curing mechanism, and articles comprising the low temperature cure composite coatings. The low temperature cure coating compositions cure at temperatures of 100° C. or less and thus, are suitable for heat sensitive or plastic substrates.

In typical automotive coatings, four or more layers are applied to the metal surface of a vehicle. Although the conventional process is adequate and used commercially worldwide in the automotive industry, due to ever increasing demand for improved weather resistance, reduced or lowered environmental impact and reduced production cost there is an ongoing research and development effort to obtain improvement in each of these parameters. Any reduction in energy, cost of materials, or the time required to make these coatings would result in large economic gains due to the large scale of use. In particular, there is an ongoing effort to reduce or eliminate the use of solvents in the process while maintaining or improving weather resistance performance. Simultaneously, a reduction in energy consumption and cost by lowering the required curing temperature and time would be advantageous.

Conventionally, the coating process for a vehicle includes a pretreatment of the body substrate, application of an anti-corrosion layer, a sealer layer, a primer and a topcoat. The pretreatment removes and cleans the surface to enable bonding of the corrosion protection layer which is applied in an electrodeposition operation. A sealer is next applied for the purpose of anti-corrosion, elimination of water leaks and minimization of chipping. A primer is then applied to promote adhesion between the surface and the basecoat to be applied as a component of the topcoat. The primer may also impart a smoother surface for subsequent layers and support the anti-chipping property of the cured coating. Finally, a topcoat that includes a basecoat and clear coat is applied. The basecoat is generally the layer containing the color component while the clear coat provides gloss, smoothness and weather resistance. Conventional top coating operations may incorporate curing operations requiring temperatures of 130 to 150° C. to assure complete crosslinking of the layers of the topcoat. Further, even though the term "topcoat" is used to describe this layer, additional layers may often be applied to the topcoat to improve the properties of the coating.

The automotive industry is being challenged to meet increasingly stringent Federal Corporate Average Fuel Economy (CAFE) standards for vehicle fleets. One key strategy to improve the overall fuel efficiency (mpg) of vehicles is to develop "light-weight" vehicles by replacement of heavier steel parts with lighter weight plastic parts. It is estimated that approximately 20% of the automotive market incorporates plastic body parts and this number is expected to continue to increase.

However, the use of plastics as part of the substrate to be coated in a conventional surface coating process as described above may be problematic in regard to structural integrity because plastic substrate materials physically deform at curing temperatures greater than 130° C. This deformation is attributed to warpage of the plastic due to melting or partial melting as well as an effect of the differential thermal expansion of the composites and adhesives employed to bond the parts. Accordingly, as the market trends toward light weight vehicles, coating operations, especially the topcoat application requires reduction of curing temperatures to effectively and efficiently allow the use of plastic and other heat sensitive materials as substrate components in order to produce light weight vehicles.

Producing coating compositions which are efficiently cured at baking temperatures of 100° C. or lower is a challenging problem for the coatings manufacturer. One method of improving the crosslinking at low temperatures is the use of highly reactive crosslinkers. Due to the highly reactive nature of these crosslinkers, the coating must be supplied as two separate compositions which are combined immediately prior to application to mix the crosslinker with the co-reactive resin. For the clear coat layer, this two component (2K) solution using a polyisocyanate crosslinker is conventionally employed. However, due to the complexity of mixing the crosslinker with multiple colors, especially in an aqueous or water-based basecoat, the 2K approach is difficult to implement with the color coat, or basecoat layer. Further complications include the inherent incompatibility of polyisocyanate crosslinkers with the water contained in water based basecoats.

Further, with regard to the basecoat, it would be beneficial to employ a single-component (1K) aqueous system that is sufficiently stable to provide a shelf-life acceptable in the industry without decomposing or prematurely curing even though a curable resin and a crosslinking agent for the curable resin are present in one composition. Additionally, problems generally associated with two-component systems including separate packaging of the components (curable resin and crosslinking agent), inaccuracy arising from measuring and metering of precise amounts of each component, the need for costly metering equipment and metering aids to ensure the precise amounts of the separate components are mixed; under- or overmixing of the components; and the need for purge lines to avoid gelling of the individual components once they are mixed may be avoided with a 1K aqueous basecoat composition.

Water basecoats typically contain acid functional resins that are neutralized with volatile amines. During baking, these amines can evaporate leaving free acid groups. These free acid groups, in turn, serve to catalyze melamine crosslinking in the basecoat. While this evaporative deblocking occurs well at high temperatures above 120 C, much less of the amine is able to disassociate and evaporate at temperatures below 110 C. This reduces the amount of catalyst needed for crosslinking and the film properties are poor.

In the case of tertiary amines such as dimethylethanolamine, this evaporative deblocking is the primary deblocking mechanism. In the case of primary or secondary amines such as 2-amino, 2-methyl, 1-propanol, there are alternative deblocking mechanisms that involve reaction of the amine to form compounds that are less basic or non-basic. One such reaction is with an isocyanate group which forms a non-basic urea compound. This can be facilitated when a polyisocyanate clearcoat is applied over the water basecoat. In the case of primary or secondary amine neutralized water basecoats using a polyisocyanate clearcoat, improved basecoat cure can be realized.

However, another reaction that can occur is when the primary or secondary amines react with formaldehyde from the melamine formaldehyde resin. While this can facilitate de-blocking during the bake, this reaction can also occur within the basecoat during storage. This can result in a drop in the basecoat pH value. This drop in pH is undesirable as it can promote crosslinking of the melamine and destabilize the colloidal state of the resins and pigments. Such an unstable basecoat will have a shelf life that is shorter than is convenient for supply chain purposes.

Thus it would be desirable to find amines that could react with polyisocyanates to form a non-basic product, but will not result in a significant pH drop during storage. The inventors have surprisingly discovered that secondary amines having the properties described herein are useful to obtain these requirements.

Thus one object of the present invention is to provide a storage stable 1K aqueous basecoat composition which is curable in contact with a solvent borne clear coat composition at a baking temperature of 100° C. or lower.

A further object of the invention is to provide a method to prepare a topcoat layer for an automotive surface coating wherein the aqueous storage stable 1K basecoat and solvent borne clear coat are simultaneously cured at a baking temperature of 100° C. or lower.

A further object is to provide a substrate coated with a crosslinked topcoat of a co-cured aqueous 1K color basecoat and a solvent borne clear coat.

BRIEF SUMMARY OF THE INVENTION

These and other objects are provided according to the present invention, the first embodiment of which includes a 1K basecoat composition, comprising: a melamine formaldehyde crosslinker; a resin having groups reactive with the crosslinker; and water; wherein a component of the basecoat composition comprises at least one acid group such that a multiplicity of acid groups is present in the 1K basecoat composition, the multiplicity of acid groups is at least partially neutralized with at least one organic amine component selected from the group consisting of a secondary amine and a formaldehyde condensate of the secondary amine, a pH of the composition is from 7.5 to 9.0, and a pKa of the formaldehyde condensate of the organic amine is at least 8.0.

In one aspect of the first embodiment, the 1K basecoat composition is storage stable wherein a change in pH of the composition after 8 weeks storage is 0.2 or less.

In another aspect of the first embodiment, a partition coefficient (log P) at pH 8 of the secondary amine is from 2.0 to −1.0. In another aspect the multiplicity of acid groups at least partially neutralized comprises at least one of carboxylic acid groups, phosphonic acid groups, alkyl ester acid phosphate groups and sulfonic acid groups. In a further aspect of the first embodiment, the secondary amine neutralizing the acid units is a cycloalkylamine or dialkylamine having 7 carbons or less and in a specific aspect the secondary amine is at least one of diethylamine, dipropylamine, diisopropylamine, piperidine and pyrrolidine.

In a second embodiment, a method to topcoat a substrate with a solvent borne clear coat composition and the 1K aqueous basecoat composition of the first embodiment is included. The method comprises: coating a surface of the substrate with the aqueous 1K melamine formaldehyde crosslinker composition to obtain a basecoat coating; at least partially drying the basecoat coating; applying a solventborne isocyanate clear coat composition to the at least partially dried basecoat to obtain a dual coating of basecoat layer and clear coat layer; and curing the dual coating at a temperature of from ambient temperature to 110° C.; wherein the solventborne isocyanate clear coat composition comprises a polyisocyanate.

In an aspect of this second embodiment a method wherein an aqueous primer coat is applied, partially dried, then the 1K basecoat and solventborne clearcoat applied as above and the three wet on wet coatings are cured at a temperature of from ambient temperature to 110° C.

In an aspect of the second embodiment, the polyisocyanate component of the solventborne clear coat comprises an aliphatic polyisocyanate having from 2 to 6 isocyanate groups.

In another embodiment, the present invention includes a multilayer coating, comprising: i) a 1K basecoat composition, comprising: a melamine formaldehyde crosslinker; a resin having groups reactive with the crosslinker; and water; wherein a component of the basecoat composition comprises at least one acid group such that a multiplicity of acid groups is present, the multiplicity of acid groups is at least partially neutralized with at least one component selected from the group consisting of a secondary amine and a formaldehyde condensate of the secondary amine, a pH of the composition is from 7.5 to 9.0, and a pKa of the formaldehyde condensate of the secondary amine is at least 8.0; and ii) a solventborne clear coat composition covering the basecoat, comprising: a polyisocyanate; a hydroxy functional resin; and a solvent.

In a further embodiment, the present invention includes crosslinked multilayered coating obtained by curing the multilayer coating of the multilayer coating embodiment, comprising: i) a base coat comprising a reaction product of the melamine formaldehyde crosslinker and the resin having acid groups and groups reactive to the melamine formaldehyde crosslinker; and ii) a clear coat comprising a reaction product of the hydroxy functional resin and the polyisocyanate crosslinker; wherein at least one of the base coat and the clear coat comprises a reaction product of the at least one amine component and the polyisocyanate crosslinker.

The foregoing description is intended to provide a general introduction and summary of the present invention and is not intended to be limiting in its disclosure unless otherwise explicitly stated. The presently preferred embodiments, together with further advantages, will be best understood by reference to the following detailed description and Example.

DETAILED DESCRIPTION OF THE INVENTION

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. The term "storage stable" according to the present invention describes that the composition can be stored at ambient temperature for six months without substantial increase of viscosity and without settling of solids. Further, the pH change during storage is 1 pH unit or less. All other terms are interpreted according to the conventional meaning understood by one of skill in the art.

In the first embodiment the present invention provides a storage stable aqueous 1K basecoat composition. Waterborne basecoats have become the primary basecoat used throughout the U.S. automobile manufacturing industry since 2000 due to their environmental benefits especially with regard to volatile organic compound (VOC) emission and lack of necessity for solvent handling systems. Further, although polyisocyanate crosslinkers have been employed in 1K and 2K solvent borne basecoat compositions, due to their reactivity with water they are not suitable for aqueous 1K basecoat compositions.

Aminoplast resins have been conventionally employed as polyol resin crosslinking agents and are based on the condensation products of formaldehyde, with an amino- or amido-group carrying substance, such as melamine, urea, or benzoguanamine, preferably melamine. Aminoplasts, or amino resins, are described in *Encyclopedia of Polymer Science and Technology* vol. 1, p. 752-789 (1985), the disclosure of which is hereby incorporated by reference.

The aminoplast resins preferably contain methylol or similar alkylol groups, and in most instances at least a portion of these alkylol groups may be etherified by reaction with an alcohol. Any monohydric alcohol may be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins of the present invention are based on melamine partially alkylated with methanol or butanol or mixtures thereof.

Melamine formaldehyde resins including either a methylol group (—$CH_2OH$), an alkoxymethyl group of general formula —$CH_2OR_1$, where $R_1$ is an alkyl chain having from 1 to 20 carbon atoms, preferably from 1 to 6 carbon atoms, more preferably from 1 to 4 carbon atoms, and combinations thereof are preferred.

The crosslinking agent of the waterborne coating composition is preferably selected from hexamethylol melamine (HMM), which has the following structure:

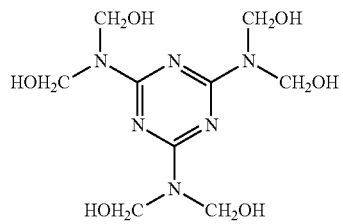 [SMILES: OCN(CO)c1nc(N(CO)CO)nc(N(CO)CO)n1]

hexamethoxymethyl melamine (HMMM), which has the following structure:

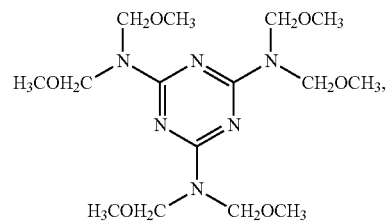

hexa(butoxymethyl) melamine (HBMM), which has the following structure:

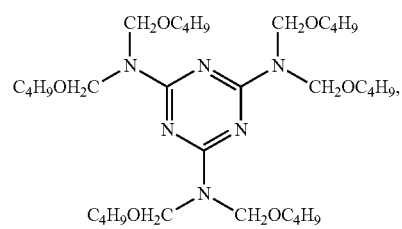

and
melamines substituted with combinations of methylol groups, methoxymethyl groups, and/or butoxymethyl groups:

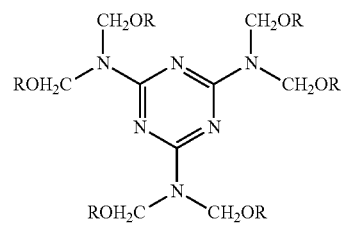

where each R is independently selected from H and $C_{1-4}$ alkyl groups, preferably $CH_3$ and $C_4H_9$, with the proviso that at least two R groups are different.

The methylol and alkoxymethyl groups of the melamine crosslinking agent (e.g., the $CH_2OCH_3$ ether groups of HMMM) are particularly reactive with the hydroxyl groups of a hydroxy-functional resin when catalyzed by an acid catalyst such as a carboxylic acid, an organic ester acid phosphate, a phosphonic acid or a sulfonic acid.

In an aspect of the embodiments of the invention, the melamine formaldehyde crosslinker may be a high imino type resin of a formula (I). The R groups may be C1 to C4 alkyl groups, preferably methyl groups. Such crosslinkers may be oligomeric in structure and are compatible with water and aqueous mixtures of alcohols, low molecular weight water miscible esters and ketones. Further, these imino crosslinkers are reactive with weak acid catalysts such as carboxylic acids.

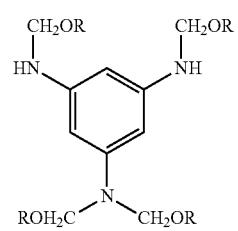

(I)

Crosslinkers of formula (I) are commercially available under the trade name CYMEL® from Cytec Industries and RESIMENE® from INEOS Melamines, LLC.

The low temperature crosslinking agent may be present in the waterborne 1K coating composition in an amount of from 10 to 90 percent by weight, preferably from 15 to 65 percent by weight, and more preferably from 20 to 40 percent by weight, based on a total weight of resin solids in the composition.

As indicated above, crosslinking of melamine formaldehyde resins in automotive coatings may be catalyzed by acids. In water based basecoats, these acids can come from as many as four sources. First, the co-reactive polyol resins that crosslink with the melamine may be made water dispersible by the inclusion of acid groups on the resin. The acid groups generally arranged as side groups of the vinyl backbone are obtained by copolymerization of monomers selected from the group consisting of acrylic acid, methacrylic acid, acrylic acid dimer, crotonic acid, isocrotonic acid and maleic acid with (meth)acrylate monomers, vinyl monomers and styrene monomers. Vinyl phosphonic acid monomers, vinyl phosphate ester monomers and vinyl sulfonic acid monomers may also be copolymerized as recognized by one of skill in the art. Imparting water dispersibility to polyol polymers via copolymerization or grafting is known to one of skill in the art. These acid groups may be salted or neutralized with an amine to make water soluble or dispersible salts of the resulting anionic polyols.

Examples of suitable polyols may include poly(meth)acrylate polyols, polyesterpolyols, polyurethane polyols or hybrids of these. In the present application the term poly(meth)acrylate polyol is a generic description for polyacrylates, polymethacrylates and copolymers of methacrylates and acrylates. In the present application the term hybrid relative to the polyol polymer refers to copolymer combinations such as polyetherester polyols, polyester urethane polyols, polyether urethane polyols and all combinations thereof as known to one of skill in the technology.

The polyol polymer may have a number average molecular weight (Mn), as measured by gel permeation chromatography (GPC), from 500 to 30,000, or from 600 to 20,000, or from 750 to 10,000. Further, a hydroxyl equivalent weight of the polyol polymer may be from 100 to 3,000 grams resin/eq hydroxyl, preferably from 200 to 1,500 grams resin/eq hydroxyl, and more preferably from 250 to 800 grams resin/eq hydroxyl, or even 300 to 700 grams resin/eq hydroxyl.

The second source of acid groups in the 1K aqueous composition may be derived from emulsifying resins added to the 1K composition or from anionic surfactants contained in the 1K composition. Emulsifying resins are conventionally known and include poly(meth)acrylate polymers containing copolymerized monomers selected from the group consisting of acrylic acid, methacrylic acid, acrylic acid dimer, crotonic acid, isocrotonic acid, maleic acid and fumaric acid. Additionally, vinyl polymers such as styrene maleic acid copolymers or styrene maleic anhydride copolymers may be included. Further, copolymers containing sulfonic acid monomers such as p-styrene sulfonic acid and formaldehyde condensates of naphthalene sulfonic acid and aryl sulfonic acids may be employed. Sulfopolyester resins containing 5-sulfo-isophthalic acid may also be suitable. This list is not meant to be limiting and one of skill in the art recognizes the wide range of carboxylic acid and sulfonic acid dispersing resins available for such use.

Suitable anionic surfactants are also known to one of skill in the art and may include alkylbenzene sulfonic acids such as dodecylbenzenesulfonates. Again there is a wide range of anionic surfactants containing carboxylic or sulfonic acid groups available and one of skill in the art will recognize suitability of these surfactants within the metes and bounds of the present invention.

The acid groups contained in the aqueous 1K composition of the present invention may include one or more of acid dispersible polyol resins, emulsifying resins, acid catalysts and anionic surfactants. For example the acid groups of the composition may derive solely from the content of dispersible polyol resin or from a mixture of dispersible polyol resins with a dispersing resin and/or anionic surfactant.

Acid catalysts that may be included in the aqueous 1K coating composition may include an organic sulfonic acid, such as para-toluenesulfonic acid (pTSA), methanesulfonic acid (MSA), dodecylbenzene sulfonic acid (DDBSA), dinonylnaphthalene disulfonic acid (DNNDSA), and mixtures thereof.

Acid catalysts that may be included are also phosphonic acids known in the art such as, for example, n-hexyl phosphonic acid, n-octyl phosphonic acid and n-decyl phosphonic acid. Further, organic ester acid phosphates that may be employed include but are not limited to butyl acid phosphate and phenyl phosphate.

The carboxylic acid groups generally have a pKa value from 4 to 5 while sulfonic acids being stronger acids may have a pKa of 0.7 to 2.5. The phosphonic acids and organic ester acid phosphate may be intermediate between these having pKa value of from 1.5 to 3.5. These acids may be amine salted at pH of 7.5-9 in the water basecoat composition. In order for these acid groups to become active catalysts for the melamine formaldehyde crosslinkers, the amine salting groups must be removed. At conventional baking temperatures of approximately 140° C., the amines may evaporate from the coating film leaving free acid groups on the polyol resin.

The polyol resin of the 1K waterborne coating composition may be any polymer having polyol hydroxyl functionality that is reactive with the functional groups of the aminoplast crosslinker contained in the aqueous composition. In one aspect as described above the polyol resin is an acid functional polyol polymer having an acid value of at least 50 mg KOH/g, preferably at least 120 mg KOH/g and most preferably at least 240 mg KOH/g. The acid functional polymer may have molecular weight and polydispersity tailored to different applications, as determined by one of ordinary skill in the art such as water solubility, resistance to acid etch and the increased intercoat adhesion.

Generally, the hydroxy-functional resin is present in the waterborne coating composition in an amount ranging from 10 to 90 percent by weight, preferably from 35 to 65 percent by weight, and more preferably from 45 to 65 percent by weight, based on a total weight of resin solids in the composition.

In a further aspect of the first embodiment, the polyol resin may include at least one lateral carbamate functional group shown by the following formula:

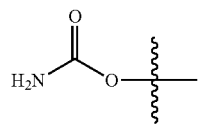

In the formula, the vertical wavy line represents a polymer main chain or backbone and the lateral extension of the carbamate functional group as opposed to a terminal position is indicated by the formula.

The amido nitrogen is reactive to melamine crosslinkers in the presence of acid catalysts and the presence of the carbamate functionality as shown in the above formula offers opportunity for formation of a highly crosslinked cured basecoat at the low cure temperatures of the present invention. As a result of the higher crosslink density of thermoset coatings obtained with the carbamate functional polyol polymers of this aspect, 1K coating compositions according to the present invention may provide improved coating properties including coatings with higher flexural modulus, improved resistance to scratch and mar, better resistance to chemical marring and hydrolysis, better weatherability, and improved adhesion.

The carbamate functional polyol polymer may be formed by any process known in the art. In one embodiment, the carbamate functional polymer (A) is formed from a method that includes preparing a backbone polymer including one or more functional groups by addition, which includes polymerizing one or more ethylenically unsaturated carbamate free monomers and one or more nonfunctional ethylenically unsaturated monomers, and reacting the backbone polymer with one or more additional reactive compounds so as to produce the carbamate functional polymer having at least one carbamate group. Description of (meth)acrylic carbamate functional polymers may be found in U.S. Pat. Nos. 6,696,535, 6,855,789 and 6,420,472, and references cited therein. With regard to synthesis of the carbamate functional polymers, the disclosure of each of these references is incorporated herein by reference.

Additionally, one of skill in the art will recognize that dihydroxy carbamate monomers such as 2,3-dihydroxypropyl carbamate (I) and

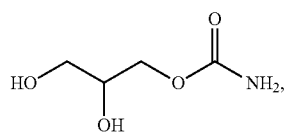

(I)

1,3-dihydroxy-2-carbamoyl propane (II)

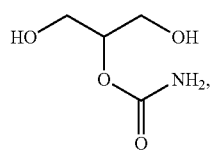

(II)

may be employed as comonomers in the synthesis of polyester polyols and polyurethane polyols to obtain carbamate functional polyol polymers. These examples are illustrative of methods to prepare carbamate functionalized polyol polymers and are not intended to be limiting. One of skill in the art will recognize that different synthetic methods may be employed to obtain these polyol polymers.

As described above, the acid groups of the acid functionalized polyol may be neutralized or partially neutralized with organic amines. By "at least partially neutralized" it is meant that at least one, but less than all, of the saltable groups on the resin are neutralized. By saying that the resin is at least partially neutralized, it is meant that at least one of the saltable groups on the resin is neutralized, and up to all of such groups may be neutralized. The degree of neutralization that is required to afford the requisite water-dispersibility for a particular resin will depend upon its chemical composition, molecular weight, and other such factors and can readily be determined by one of ordinary skill in the art through straightforward experimentation. Primary amines and secondary amines are known to be reactive to methylol and alkoxymethyl groups of the melamine crosslinking agent, whereas tertiary amines are not. Therefore, conventionally, 1K aqueous basecoat compositions which have been designed for high bake temperature curing of about 140° C. where amines are volatized and driven from the coating composition, employ tertiary amines as acid neutralizers. Because the tertiary amines are not reactive to methylol and alkoxymethyl groups of the melamine crosslinking agent the compositions are storage stable.

However, in order to design a low temperature cure 1K aqueous coating composition to be cured in conjunction with a solvent borne clear coat as a wet-on-wet two application coating, a tertiary amine cannot be employed because the low bake temperature is not sufficient to volatilize the tertiary amine and thus free the acid groups for catalysis. Accordingly, the inventors have studied the chemical interactions of the components of the 1K aqueous basecoat composition and the solvent borne clear coat composition and have surprisingly discovered that certain select secondary amines having the specific properties disclosed in the present invention may serve to prepare storage stable aminoplast 1K aqueous basecoat compositions which cure at temperatures of 100° C. or lower, including ambient temperature when cured wet-on-wet with a solvent borne clear coat composition formulated as described herein.

In selection of the amines which are elements of the embodiments of the present invention, the inventors have recognized that aqueous compositions containing aminoplast crosslinkers, especially melamine formaldehyde resins also contain a content of available formaldehyde which may be from 0.1 to 1.0% by weight based on the weight of the melamine-formaldehyde resin. Primary and secondary amines are reactive with formaldehyde to form methylolamine adducts according to the following equations:

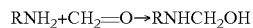

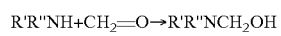

Each of the methylolamine adducts remains an amino base; however, depending on the characteristics of the R, R' and R" groups, the adduct methylolamines may have such reduced basicity that acid groups of the polyol polymer, dispersing polymer or anionic surfactant are no longer neutralized and thus, are available for acid catalysis of the crosslinking reaction. This reaction may be useful for low temperature cure of the basecoat when applied to a substrate surface if the basicity of the adduct methylolamine is insufficient to neutralize the acid group. However, the same chemistry may also occur during storage of the basecoat composition and result in a drop in the basecoat pH over time. This drop in pH negatively affects the colloidal dispersion of the anionic resins and may lead to gelation due to premature crosslinking.

In the case where the water basecoat composition is applied to a surface and top coated with a polyisocyanate containing clear coat, some diffusion of polyisocyanate crosslinker from the clear coat into the basecoat layer may occur and correspondingly, the amine may migrate into the clear coat coating. Secondary amines are reactive with the polyisocyanate crosslinker to form urea compounds which are not basic and this reaction immediately releases the acid groups for catalysis of the melamine formaldehyde crosslinker polyol condensation.

Thus, the inventors have surprisingly discovered that by consideration of and selection of amines having specific properties relative to basicity of the amine and of a corresponding methylolamine obtained from reaction with formaldehyde and partition properties governing migration from an aqueous basecoat layer into an adjacent applied solvent borne clear coat, a storage stable aqueous 1K coating composition which may be cured wet-on-wet with an adjacent applied solvent borne clear coat containing a polyisocyanate crosslinker at a temperature of 110° C. or 100° C. or lower depending on the composition of the clearcoat, may be obtained.

Thus in the first embodiment, the present invention provides 1K basecoat composition, comprising: a melamine formaldehyde crosslinker; a resin having groups reactive with the crosslinker; and water; wherein a component of the basecoat composition comprises at least one acid group such that a multiplicity of acid groups is present in the 1K basecoat composition, the multiplicity of acid groups is at least partially neutralized with at least one secondary amine and a formaldehyde condensate of the secondary amine, a pH of the composition is from 7.5 to 9.0, a change in pH of the composition after 8 weeks storage is 0.2 or less, and a pKa of the formaldehyde condensate of the secondary amine is at least 8.0.

The inventors have determined that to retain an adequate portion of the secondary amine within the aqueous coating layer when in wet-on-wet contact with a solvent borne 2K or 1K clear coat the octanol/water partition coefficient, noted as log P measured at a pH of 8 may be from 2.0 to −1.0, preferably from 1.5 to −0.5 and most preferably from 1.0 to 0. One of ordinary skill will recognize that log P is a guideline tool for assessing amine candidates, since actual migration to the clear coat layer or retention within the aqueous 1K basecoat layer will be dependent upon the nature of the solvent base of the clear coat and other factors including the influence of other additives commonly present in the composition of both layers.

According to various aspects of the first embodiment, the component of the 1K composition comprising the at least partially neutralized acid groups may be the resin having groups reactive with the melamine formaldehyde crosslinker, an emulsifying resin contained in the 1K aqueous composition, an anionic surfactant contained in the 1K aqueous composition, an acid catalyst and any combination thereof.

In one aspect of the first embodiment, the secondary amine may be a dialkyl amine. Generally the log P value of dialkyl amines increases with increasing number of carbons of the alkyl chains. For example the log P value for di-n-butyl amine is about 2.8, the log P value for di-n-propyl amine is about 1.6, the log P value for ethyl isopropyl amine is 0.93, and the log P value of diethylamine is 0.58. Thus, the inventors consider that in the case of dialkylamines suitable amines may have a maximum total of 6 or 7 carbons.

With recognition of the formation of methylol adducts of the amines with formaldehyde present in the melamine crosslinker, the inventors have also surprisingly determined that the pKa of the methylol adducts of the secondary amines is an element which contributes to the storage stability of the 1K aqueous coating. The adduct of a dialkyl amine is shown by the previously presented formula:

R'R''NCH$_2$OH.

The nitrogen atom carries a basic nonbonding electron pair and thus is capable of participating in an acid base reaction with a proton donor as generically shown in the following equation.

R'R''NCH$_2$OH+Acid-H→[Acid]$^-$[R'R''NHCH$_2$OH]$^+$

The availability of the base electron pair is influenced by the steric environment presented by the groups (R', R'' and CH$_2$OH) bonded to the N and any electronic influence of those same groups. The above equation may be described by a pKa value and the inventors have determined that in order to function as a neutralizing agent for the carboxylic, phosphonic, organic phosphate ester or sulfonic acid groups present in the 1K basecoat composition the pKa of the adduct must be at least 8.0. For example, the pKa of diethylamine is 10.8 while the pKa of the methylol adduct of diethylamine and one mole of formaldehyde is 8.9. The pKa of di-n-propyl amine is 10.9 while the pKa of the methylol adduct of di-n-propyl amine and one mole of formaldehyde is 8.01. The pKa of diisopropylamine is 10.8 while the pKa of the methylol adduct with one mole formaldehyde is 9.0. The pKa of piperidine is 10.8 while the pKa of the methylol adduct is 9.2. The pKa of pyrrolidine is 10.6 while the pKa of the methylol adduct is 8.9.

In contrast, tertiary amines are not reactive with formaldehyde and in the case of a primary amine, two methylol amine adducts may be formed due to monocondensation and dicondensation as shown in the following equations.

RNH$_2$+CH$_2$O→RNHCH$_2$OH

RNHCH$_2$OH+CH$_2$O→RN(CH$_2$OH)$_2$

However, the inventors have determined that aqueous 1K compositions based on primary amines are not pH stable on storage as shown with AMP in the Example.

Therefore, by selection of secondary amines having the properties described herein the acid groups present in the 1K aqueous coating composition remain as neutralized or salt form until applied as a basecoat and over coated with a clear coat containing a isocyanate crosslinker which reacts with the secondary amine.

As described above, the basecoat is the layer wherein color and other special effects may be applied to the substrate. Accordingly, the 1K aqueous basecoat composition may contain colorants, pigments and fillers, including special effect pigments. Nonlimiting examples of special effect pigments that may be utilized in the basecoat include metallic, pearlescent, and color-variable effect flake pigments. Metallic basecoat colors may be produced using metallic flake pigments like aluminum flake pigments, coated aluminum flake pigments, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance (degree of reflectance or color) when viewed at different angles. Metal flakes may be cornflake type, lenticular, or circulation-resistant; micas may be natural, synthetic, or aluminum-oxide type. The flake pigments are typically satisfactorily dispersed in the composition by stirring under low shear. The content of the flake pigment or pigments may be from 0.01 wt. % to about 0.3 wt. % or about 0.1 wt. % to about 0.2 wt. %, in each case based on total solids weight of the composition.

Nonlimiting examples of other suitable pigments and fillers that may be utilized in the 1K basecoat composition include inorganic pigments such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barites, ferric ammonium ferrocyanide (Prussian blue), and ultramarine, and organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, nanoparticles based on silicon dioxide, aluminum oxide, zirconium oxide, and so on. The pigment(s) and any filler(s) are preferably dispersed with a pigment dispersant according to known methods. In general, the pigment and dispersing resin, polymer, or dispersant are brought into contact under a shear high enough to break the pigment agglomerates down to the primary pigment particles and to wet the surface of the pigment particles with the dispersing resin, polymer, or dispersant. The breaking of the agglomerates and wetting of the primary pigment particles are important for pigment stability and color development. Pigments and fillers may be utilized in amounts typically of up to about 60% by weight, based on total weight of the coating composition. The amount of pigment used depends on the nature of the pigment and on the depth of the color and/or the intensity of the effect it is intended to produce, and also by the dispersibility of the pigments in the pigmented coating composition. The pigment content, based in each case on the total weight of the pigmented coating composition, is preferably 0.5% to 50%, more preferably 1% to 30%, very preferably 2% to 20%, and more particularly 2.5% to 10% by weight.

The aqueous 1K coating composition may contain water miscible solvents including glycol ethers such as ethylene glycol monobutyl ether, diethylene glycol butyl ether and dipropylene glycol methyl ether; glycol ether esters such as propylene glycol monomethyl ether acetate, ethylene glycol butyl ether acetate, 3-methoxy n-butyl acetate; and lactams, such as N-methyl pyrrolidone (NMP); and mixtures thereof. This list is not limiting and other water miscible solvents suitable for inclusion in the present 1K aqueous composition may be determined by one of skill in the art.

The content of the water miscible solvent may be from 0 to 20 weight % based on total composition weight, preferably 4 to 18 weight % and most preferably from 10 to 16 weight %.

Other additives that may be present in the 1K aqueous coating composition of the invention may include stabilizers, wetting agents, rheology control agents, dispersing agents, UV absorbers, hindered amine light stabilizers and adhesion promoters. Any one or more of such additives may be included depending on the performance properties sought by the coating formulator. If present, the content may be from 0.1 to 5 percent by weight, preferably from 0.5 to 4 percent by weight, and more preferably from 0.5 to 2.5 percent by weight, based on the total weight of solids in the compositions.

In another embodiment, the present invention provides a low temperature cure method to coat a substrate wherein the prepared substrate is first coated with the aqueous 1K coating composition described in the composition embodiment including all aspects described above to obtain a basecoat wet coating. The applied aqueous coating may then be partially dried in a conventional flash drying operation. The flash drying may generally be conducted in an air flow oven at a temperature of from 40° C. to 90° C., preferably 50 to 85° C. and most preferably 60 to 80° C. for a time of from 1 to 10 minutes, preferably 2 to 8 minutes and most preferably 3 to 6 minutes.

A two component (2K) isocyanate clear coat composition may then be applied as a topcoat to the at least partially dried basecoat to obtain a wet on wet dual coating of basecoat layer and clear coat layer and the wet on wet dual coating cured at a temperature of from ambient temperature to 100° C., preferably from 50 to 95° C. and most preferably from 75 to 90° C.

Alternately a one component (1K) clear coat may be used. However, for the 1K clearcoat using blocked polyisocyanate a higher curing temperature may be required to cure the clearcoat in the multilayer film. A one component (1K) isocyanate clear coat composition may then be applied as a topcoat to the at least partially dried basecoat to obtain a wet on wet dual coating of basecoat layer and clear coat layer and the wet on wet dual coating cured at a temperature of from 70° C. to 110° C., preferably from 80 to 110° C. and most preferably from 90 to 100° C.

The two component (2K) isocyanate clear coat composition is a solvent borne composition that when mixed and applied may include at least one hydroxy-functional resin, an isocyanate crosslinking agent, and optionally, a catalyst.

The hydroxy-functional resins included in the clear coat composition are reactive with and crosslinked by isocyanate crosslinkers and may be any polymer having a hydroxyl functionality that is reactive with isocyanate functional groups of the isocyanate crosslinker. Preferably, the hydroxy-functional resin is at least one member selected from the group consisting of an acrylic polymer having a hydroxyl functionality and a polyester polymer having a hydroxyl functionality. Most preferably the hydroxy-functional resin is an acrylic polymer having hydroxyl functionality. In addition to the hydroxy functional group, the hydroxy-functional resin may comprise a further reactive functionality so long as it is reactive with an isocyanate crosslinker. In certain embodiments, the clear coat hydroxy-functional resin includes at least one further functionality selected from the group consisting of an amine functionality, a carboxylic acid functionality, and an epoxy functionality.

The clear coat hydroxy-functional resin may have a number average molecular weight (Mn), as measured by gel permeation chromatography (GPC), from 500 to 30,000, or from 600 to 20,000, or from 750 to 10,000. Further a hydroxyl equivalent weight of the clear coat hydroxy-functional resin may be from 100 to 3,000 grams resin/eq hydroxyl, preferably from 200 to 1,500 grams resin/eq hydroxyl, and more preferably from 250 to 800 grams resin/eq hydroxyl, or even 300 to 700 grams resin/eq hydroxyl.

Suitable hydroxy-functional acrylic resins and hydroxy-functional polyester resins have sufficient hydroxyl contents for reactivity at the desired low curing temperature range described above. Generally, the content of the hydroxy-functional resin in the clear coat composition is from 10 to 90 percent by weight, preferably from 35 to 65 percent by weight, and more preferably from 45 to 65 percent by weight, based on a total weight of resin solids in the clear coat composition.

The crosslinking agent of the solvent borne 2K coating composition is a polyisocyanate having 2 to 6 isocyanate groups suitable for the crosslinking. Preference may be given to isocyanates containing from 3 to 36, preferably 4 to 16 and more preferably 6 to 12 carbon atoms. Examples of suitable diisocyanates include, but are not limited to, trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4-diphenylene diisocyanate (e.g. 4,4'-methylene bisdiphenyldiisocyanate), 1,5-naphthylene diisocyanate, 1,4-naphthylene diisocyanate, 1-isocyanatomethyl-3-isocyanato-3,5,5-trimethylcyclohexane (isophorone diisocyanate or IPDI), 1,3-bis(1-isocyanato-1-methylethyl)benzene (m-tetramethylxylene diisocyanate or TMXDI), bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexane. Of these, hexamethylene diisocyanate, IPDI, and TMXDI are preferred. It is also possible to use polyisocyanates of higher isocyanate functionality. Examples of these include tris(4-isocyanatophenyl)methane, 1,3,5-triisocyanatobenzene, 2,4,6-triisocyanatotoluene, 1,3,5-tris(6-isocyanatohexylbiuret), bis(2,5-diisocyanato-4-methylphenyl) methane, 1,3,5-tris(6-isocyanatohexyl)-1,3,5-triazinane-2,4,6-trione (i.e., hexamethylene diisocyanate cyclic trimer).

Alternatively, the clear coat composition may be a 1K composition wherein the polyisocyanate crosslinker may be blocked. In the blocked isocyanate resin more than 90% of the NCO groups are blocked, preferably more than 95%, most preferably more than 99%. The 1K composition may contain hydroxy-functional resins as previously described.

The isocyanate resin, blocked or unblocked, may have a number average molecular weight (Mn), as measured by gel permeation chromatography (GPC), from 150 to 30,000, or from 200 to 20,000, or from 250 to 10,000. An isocyanate (NCO) equivalent weight (grams of crosslinking agent/ equivalent of NCO) of the polyisocyanate crosslinker may be from 50 to 1000, preferably from 100 to 500, and more preferably from 150 to 250 g/NCO.

The blocking agents of the 1K clear coat composition may be used individually or in combination and suitable blocking agents include ether alcohols, alkyl alcohols, oximes, amines, amides, hydroxylamines, or any compound with active hydrogen.

Alkyl alcohol blockers may include aliphatic, cycloaliphatic or aromatic alkyl monoalcohols having 1-20 carbon atoms in the alkyl group, for example, methanol, ethanol, n-propanol, butanol, pentanol, hexanol, heptanol, octanol, nonanol, 2-ethyl hexanol, 3,3,5-trimethylhexan-1-ol, cyclopentanol, cyclohexanol, cyclooctanol, phenol, pyridinol, thiophenol, cresol, phenylcarbinol, and methylphenylcarbinol. Polyfunctional alcohols such as glycerol and trimethylolpropane may also be employed as a blocking agent.

Ether alcohol blocking agents may include ethylene glycol mono alkyl ether, diethylene glycol mono alkyl ether, propylene glycol mono alkyl ether or dipropylene glycol mono alkyl ether with alkyl group of 1-10 carbon atoms, for example, diethylene glycol mono butyl ether, ethylene glycol butyl ether, diethylene glycol mono methyl ether, ethylene glycol methyl ether, dipropylene glycol mono methyl ether, dipropylene glycol mono butyl ether, propylene glycol mono butyl ether, propylene glycol mono methyl ether.

Oximes suitable as blocking agents include methyl ethyl ketone oxime, methyl isopropyl ketone, methyl isobutyl ketone oxime, methyl isoamyl ketone oxime, methyl n-amyl ketone oxime, methyl 2-ethylhexyl ketone oxime, cyclobutanone oxime, cyclopentanone oxime, cyclohexanone oxime, 3-pentanone oxime, 2,4-dimethyl-3-pentanone oxime (i.e., diisopropyl ketone oxime), diisobutyl ketone oxime, di-2-ethylhexyl ketone oxime, acetone oxime, formaldoxime, acetaldoxime, propionaldehyde oxime, butyraldehyde oxime, glyoxal monoxime, diacetyl monoxime.

In one embodiment, the blocking agent may be at least one selected from the group consisting of imidazole, dimethylpyrazole, acetoacetone, alkyl esters of acetoacetate and diethylmalonate. Neutral nonbasic blocking agents may be highly suitable in aspects of the present invention. In one embodiment, the blocked isocyanate resin may be a dimethylpyrazole blocked hexamethylene diisocyanate (HDI) which is a reacted form of a second isocyanate resin (HDI) and a blocking agent dimethylpyrazole, such as for example, sold under the tradename Desmodur®, preferably Desmodur PL-350.

In one aspect of this embodiment where the 2K solvent borne clear coat is employed, the polyisocyanate crosslinker is immediately available for reaction with isocyanate reactive groups present in the 2K solvent borne composition as well as any amine neutralizer from the 1K basecoat composition.

In another aspect of this embodiment, where the solvent borne 1K clear coat is employed it is understood that in order to obtain an efficient low temperature (below 110° C.) wet on wet curing of the 1K aqueous basecoat layer and the 1K clear coat layer the polyisocyanate blocking agent combination selected must be capable of thermally deblocking at a temperature less than 110° C., preferably less than 90° C., and more preferably less than 80° C.

The 1K or 2K clear coat compositions of the present invention are solvent borne compositions and may contain any of the solvents conventionally known. Solvents which may be suitable include aromatic solvents, such as toluene, xylene, naptha, and petroleum distillates; aliphatic solvents, such as heptane, octane, and hexane; ester solvents, such as butyl acetate, isobutyl acetate, butyl propionate, ethyl acetate, isopropyl acetate, butyl acetate, amyl acetate, hexyl acetate, heptyl acetate, ethyl propionate, isobutylene isobutyrate, ethylene glycol diacetate, and 2-ethoxyethyl acetate; ketone solvents, such as acetone, methyl ethyl ketone, methyl amyl ketone, and methyl isobutyl ketone; lower alcohols, such as methanol, ethanol, isopropanol, n-butanol, 2-butanol; glycol ethers such as ethylene glycol monobutyl ether, diethylene glycol butyl ether; glycol ether esters such as propylene glycol monomethyl ether acetate, ethylene glycol butyl ether acetate, 3-methoxy n-butyl acetate; lactams, such as N-methyl pyrrolidone (NMP); and mixtures thereof. In certain embodiments the solvent may be a VOC exempt solvent such as chlorobromomethane, 1-bromopropane, $C_{12-18}$ n-alkanes, t-butyl acetate, perchloroethylene, benzotrifluoride, p-chlorobenzotrifluoride, acetone, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane.

In preferred aspects of the present invention, the solvent system of the clear coating composition (1K or 2K) may be selected in consideration that the organic amine from the 1K basecoat wet layer has sufficient solubility to allow migration into the clear coat layer for reaction with the polyisocyanate crosslinker. Thus, lower molecular weight alcohols such as butanol and lower molecular weight esters such as t-butyl acetate may be particularly suitable solvent. Moreover, aromatic solvents or mixtures of aromatic solvents may also be particularly suitable.

As previously indicated the clear coat composition may optionally contain a catalyst to promote reaction of the hydroxy functional resin and the polyisocyanate crosslinker. The metal catalyst are conventionally known and may be an organometallic compound selected from aliphatic bismuth carboxylates such as bismuth ethylhexanoate, bismuth subsalicylate (having an empirical formula $C_7H_5O_4Bi$), bismuth hexanoate, bismuth ethylhexanoate or dimethylol-propionate, bismuth oxalate, bismuth adipate, bismuth lactate, bismuth tartarate, bismuth salicylate, bismuth glycolate, bismuth succinate, bismuth formate, bismuth acetate, bismuth acrylate, bismuth methacrylate, bismuth propionate, bismuth butyrate, bismuth octanoate, bismuth decanoate, bismuth stearate, bismuth oleate, bismuth eiconsanoate, bismuth benzoate, bismuth malate, bismuth maleate, bismuth phthalate, bismuth citrate, bismuth gluconate; bismuth acetylacetonate; bis-(triorgano tin)oxides such as bis(trimethyl tin) oxide, bis(triethyl tin) oxide, bis(tripropyl tin) oxide, bis(tributyl tin) oxide, bis(triamyl tin) oxide, bis(trihexyl tin) oxide, bis(triheptyl tin) oxide, bis(trioctyl tin) oxide, bis(tri-2-ethylhexyl tin) oxide, bis(triphenyl tin) oxide, bis(triorgano tin)sulfides, (triorgano tin)(diorgano tin) oxides, sulfoxides, and sulfones, bis(triorgano tin)dicarboxylates such as bis(tributyl tin) adipate and maleate; bis(triorgano tin)dimercaptides, triorgano tin salts such as trioctyl tin octanoate, tributyl tin phosphate; (triorgano tin) (organo tin)oxide; trialkoxy tin oxides such as trimethyl methoxy tin oxide, dibutyl tin diacetylacetonate, dibutyl tin dilaurate; trioctyl tin oxide, tributyl tin oxide, dialkyl tin compounds such as dibutyl tin oxide, dioctyl tin oxide, dibutyl tin dilaurate, dibutyl tin diacetate, dibutyl tin dimaleate, dibutyl tin distearate, dipropyl tin dioctoate and dioctyl tin oxide; monoalkyl tin compounds such as monobutyltin trioctanoate, monobutyl tin triacetate, monobutyl tin tribenzoate, monobutyl tin trioctylate, monobutyl tin trilaurate, monobutyl tin trimyristate, monomethyl tin triformate, monomethyl tin triacetate, monomethyl tin trioctylate, monooctyl tin triacetate, monooctyl tin trioctylate, monooctyl tin trilaurate; monolauryl tin triacetate, monolauryl tin trioctylate, and monolauryl tin trilaurate; zinc octoate, zinc naphthenate, zinc tallate, zinc carboxylates having from about 8 to 14 carbons in the carboxylate groups, zinc acetate; lithium carboxylates such as lithium acetate, lithium 2-ethylhexanoate, lithium naphthenate, lithium butyrate, lithium isobutyrate, lithium octanoate, lithium neodecanoate, lithium oleate, lithium versatate, lithium tallate, lithium oxalate, lithium adipate, lithium stearate; lithium hydroxide; zirconium alcoholates, such as methanolate, ethanolate, propanolate, isopropanolate, butanolate, tert-butanolate, isobutanolate, pentanolate, neopentanolate, hexanolate and octanolate; zirconium carboxylates such as formate, acetate, propionate, butanoate, isobutanoate, pentanoate, hexanoate, cyclohexanoate, heptanoate, octanoate, 2-ethylhexanoate, nonanoate, decanoate, neodecanoate, undecanoate, dodecanoate, lactate, oleate, citrate, benzoate, salicylate and phenylacetate; zirconium 1,3-diketonates such as acetylacetonate (2,4-pentanedionate), 2,2,6,6-tetramethyl-3,5-heptanedionate, 1,3-diphenyl-1,3-propanedionate (dibenzoylmethanate), 1-phenyl-1,3-butananedionate and 2-acetylcyclohexanonate; zirconium oxinate; zirconium 1,3-ketoesterates, such as methyl acetoacetate, ethyl acetoacetate, ethyl-2-methyl acetoacetate, ethyl-2-ethyl acetoacetate, ethyl-2-hexylacetoacetate, ethyl-2-phenyl-acetoacetate, propyl acetoacetate, isopropyl acetoacetate, butyl acetoacetate, tert-butyl acetoacetate, ethyl-3-oxo-valerate, ethyl-3-oxo-hexanoate, and 2-oxo-cyclohexane carboxylic acid ethyl esterate; zirconium 1,3-ketoamidates, such as N,N-diethyl-3-oxo-butanamidate, N,N-dibutyl-3-oxo-butanamidate, N,N-bis-(2-ethylhexyl)-3-oxo-butanamidate, N,N-bis-(2-methoxyethyl)-3-oxo-butanamidate, N,N-dibutyl-3-oxo-heptanamidate, N,N-bis-(2-methoxyethyl)-3-oxo-heptanamidate, N,N-bis-(2-ethylhexyl)-2-oxo-cyclopentane carboxamidate, N,N-dibutyl-3-oxo-3-phenylpropanamidate, N,N-bis-(2-methoxyethyl)-3-oxo-3-phenylpropanamidate; and combinations of the foregoing metal catalysts.

In one preferred aspect, the metal catalyst may be a dialkyl tin compound selected from dibutyltin oxide, dioctyl tin oxide, dibutyl tin dilaurate, dibutyl tin diacetate, dibutyl tin dimaleate, dibutyl tin distearate, dipropyl tin dioctoate, and dioctyl tin oxide. Dibutyl tin dilaurate may be preferred.

If present, the amount of the metal catalyst included in the solvent borne clear coat composition may be from 0.01 to 10 percent by weight, preferably from 0.05 to 7.5 percent by weight, and more preferably from 1.0 to 5.0 percent by weight, based on the total weight of solids in the coating composition. The compatibility and stability of the catalyst containing compositions may require special techniques to incorporate the catalyst as may be determined by one of skill in the art.

Example II shows results for application and testing of a 1K solvent borne clearcoat over the 1K basecoat and demonstrates that an unexpected increase of resistance to blister formation in a water soak test may be obtained according to embodiments of the present invention. Further, good adhesion may correspondingly be obtained.

As described for the 1K aqueous basecoat composition, the clear coat may also contain stabilizers, wetting agents, rheology control agents, dispersing agents, UV absorbers, hindered amine light stabilizers and adhesion promoters. Any one or more of such additives may be included depending on the performance properties sought by the coating formulator. If present, the content may be from 0.1 to 5 percent by weight, preferably from 0.5 to 4 percent by weight, and more preferably from 0.5 to 2.5 percent by weight, based on the total weight of solids in the compositions.

According to the method to coat a substrate according to the present invention the wet on wet dual coatings of the aqueous 1K basecoat and the solvent borne clear coat are cured simultaneously. Although not wishing to be limited by theory, the inventors believe that because of the wet on wet condition of the two applied coating layers, migration of the secondary organic amine into the clear coat layer may occur and the migrated amine may directly react with the polyisocyanate to obtain urea products. Conversely, the polyisocyanate may migrate into the aqueous environment of the 1K coating and react with the secondary amine. It is also possible both types of migration may take place.

The effect of reaction of the secondary amine with the polyisocyanate to form urea eliminates the acid base salt structure, lowers the pH of the aqueous layer and frees the carboxylic acid, phosphonic acid, alkyl ester acid phosphate or sulfonic acid groups to catalyze the crosslinking of the polyol polymer resin and the melamine formaldehyde crosslinker in the basecoat. Because the molar amount of secondary amine in the aqueous basecoat is small compared to the polyisocyanate crosslinker level in the clear coat, only small amounts of polyisocyanate crosslinker are required to completely consume the amine. Therefore, this reaction has minimal effect on the curing of the clear coat coating layer. Further, additional polyisocyanate crosslinker may be added to compensate for the crosslinker consumed by the secondary amine.

In another aspect of the method described, the 1K basecoat as described may be applied to a wet aqueous primer coating and then the clearcoat applied as described above and the three wet-on-wet layers cured simultaneously. According to this aspect a conventional aqueous primer coat may be applied to the substrate and the primer partially dried by ambient air for three to seven minutes or heat flash treated at 40 to 90°. The 1K basecoat may then be applied and the two wet on wet layers flash heat treated at 40 to 90°. No matter whether the primer is treated to ambient flash or heat flash, the two layer composition with the 1K basecoat must be heat flash treated as described before application of the clearcoat.

The inventors have unexpectedly discovered that dramatic improvement in film properties such as watersoak blistering (see Examples) may be obtained according to the embodiments and aspects described herein. Such significant improvement may be a result of improved interlayer crosslinking obtained through the interaction of the secondary amine from the 1K aqueous layer and the polyisocyanate of the solvent borne clear coat layer.

Moreover, in the embodiments wherein the polyol resin of the 1K basecoat contains pendent carbamate groups as previously described, further additional crosslinking of the carbamate and melamine crosslinker may be obtained resulting in a film having good weather and chemical resistance.

Treatment of the wet on wet two layer 1K aqueous basecoat solvent borne clear coat at a temperature of 110° C. or less, preferably 60 to 98° C., more preferably 70 to 95° C. and most preferably 80 to 90° C. results in crosslinking and curing the dual coating composition as described above and volatilizes the solvent and remaining water from the 1K composition. The elevated temperature promotes the crosslinking of the hydroxy functionalized resin and polyisocyanate crosslinker of the clear coat. If the polyisocyanate crosslinker is blocked as previously described the temperature of the cure treatment must be sufficient to deblock the polyisocyanate for crosslinking.

Each of the 1K basecoat and solvent borne clear coat coating compositions may be applied to the substrate in order to give dry film thicknesses from 5 to 90 μm, preferably from 7.5 to 75 μm, and more preferably from 10 to 50 μm. For example, the dry film thickness of the basecoat may be from 5 to 35 μm, preferably from 10 to 30 μm, and more preferably about 20 μm, and the dry film thickness of the clear coat may be from 10 to 70 μm preferably from 25 to 50 μm, and more preferably about 45 μm.

Thus as described heretofore, the specific embodiments are as follows:

Embodiment 1. A 1K basecoat composition, comprising: a melamine formaldehyde crosslinker; a resin having groups reactive with the crosslinker; and water; wherein a component of the basecoat composition comprises at least one acid group such that a multiplicity of acid groups is present in the 1K basecoat composition, the multiplicity of acid groups is at least partially neutralized with at least one organic amine component selected from the group consisting of a secondary amine and a formaldehyde condensate of the secondary amine, a pH of the composition is from 7.5 to 9.0, and a pKa of the formaldehyde condensate of the secondary amine is at least 8.0.

In one aspect of the first embodiment, the 1K basecoat composition is storage stable wherein a change in pH of the composition after 8 weeks storage is 0.2 or less.

Embodiment 2. The composition of Embodiment 1, wherein a partition coefficient at pH 8 of the secondary amine (log P) is from 2.0 to −1.0.

Embodiment 3. The composition of Embodiments 1 or 2, wherein the multiple acid groups comprise at least one of carboxylic acid groups, phosphonic acid groups, organic ester acid phosphate groups and sulfonic acid groups.

Embodiment 4. The composition of any one of Embodiments 1 to 3, wherein the secondary amine comprises a dialkyl amine or cycloalkyl amine of 7 carbons or less.

Embodiment 5. The composition of any one of Embodiments 1 to 4, wherein the secondary amine is at least one of diethylamine, dipropylamine, diisopropylamine, piperidine and pyrrolidine.

Embodiment 6. The composition of any one of Embodiments 1 to 5 wherein the melamine formaldehyde crosslinker comprises alkyl ether groups.

Embodiment 7. The composition of any one of Embodiments 1 to 6 wherein the melamine formaldehyde crosslinker is of formula (I):

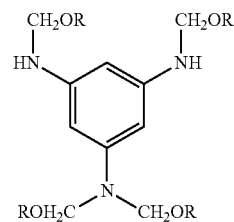

wherein R are each independently selected from C1 to C4 alkyl.

Embodiment 8. The composition of Embodiment 7, wherein R of the melamine formaldehyde crosslinker of formula (I) is methyl.

Embodiment 9. The composition of any one of Embodiments 1 to 8 further comprising at least one of a pigment and a coloring agent.

Embodiment 10. The composition of any one of Embodiments 1 to 9 wherein the resin having groups reactive with the melamine formaldehyde crosslinker comprises a polyol polymer selected from the group consisting of poly(meth)acrylatepolyols, polyesterpolyols, polyurethanepolyols or hybrid mixtures thereof.

Embodiment 11. The composition of any one of Embodiments 1 to 10 wherein the component comprising at least one acid group is at least one selected from the group consisting of a water dispersible polyol polymer, an emulsifying resin, an anionic surfactant and an acid catalyst.

Embodiment 12. The composition of any one of Embodiments 1 to 11 wherein the resin having groups reactive with the crosslinker further comprises at least one lateral carbamate functional group.

Embodiment 13. A method to coat a substrate, comprising: coating a surface of the substrate with the 1K aqueous coating composition of any one of Embodiments 1 to 12 to obtain a basecoat; at least partially drying the basecoat; applying a solvent borne isocyanate clear coat composition to the at least partially dried basecoat to obtain a wet on wet coating of the basecoat layer and the clear coat layer; drying and curing the dual coating at a temperature of from ambient temperature to 110° C.; wherein the solventborne isocyanate clear coat composition comprises a polyisocyanate crosslinker.

Embodiment 14. The method to coat a substrate of Embodiment 13, wherein the polyisocyanate component of the solventborne clear coat comprises an aliphatic polyisocyanate having from 2 to 6 isocyanate groups.

Embodiment 15. The method to coat a substrate of Embodiments 13 or 14, wherein the solventborne clear coat is a two component (2K) composition comprising an unblocked polyisocyanate crosslinker.

Embodiment 16. The method to coat a substrate of Embodiments 13 or 14, wherein the solventborne clear coat is a one component (1K) composition comprising a blocked polyisocyanate crosslinker.

Embodiment 17. The method to coat a substrate of Embodiment 16, wherein the blocked polyisocyanate crosslinker comprises a blocking agent selected from the group consisting of an ether alcohol, an alkyl alcohol, an oxime, an amine, an amide, a hydroxylamine, or any compound with active hydrogen.

Embodiment 18. The method to coat a substrate of Embodiments 16 or 17, wherein the blocked polyisocyanate crosslinker comprises a blocking agent selected from the group consisting of imidazole, dimethylpyrazole, acetoacetone, alkyl esters of acetoacetate and diethylmalonate.

Embodiment 19. The method to coat a substrate of any one of Embodiments 13 to 18, wherein the curing temperature is from 50 to 95° C.

Embodiment 20. The method to coat a substrate of any one of Embodiments 13 to 19, wherein a partition coefficient at pH 8 of the secondary amine (log P) of the 1K aqueous basecoat is from 2.0 to −1.0.

Embodiment 21. The method to coat a substrate of any one of Embodiments 13 to 20, wherein the multiple acid groups of the 1K aqueous basecoat comprise at least one of carboxylic acid groups, phosphonic acid groups, organic ester phosphate acid groups and sulfonic acid groups.

Embodiment 22. The method to coat a substrate of any one of Embodiments 13 to 21, wherein the secondary amine of the 1K aqueous basecoat comprises a cycloalkyl amine or dialkyl amine of 7 carbons or less.

Embodiment 23. The method to coat a substrate of any one of Embodiments 13 to 22, wherein the secondary amine is at least one of diethylamine, dipropylamine, diisopropylamine, piperidine and pyrrolidine.

Embodiment 24. The method to coat a substrate of any one of Embodiments 13 to 23, wherein the melamine formaldehyde crosslinker comprises alkyl ether groups.

Embodiment 25. The method to coat a substrate of any one of Embodiments 13 to 24, wherein the melamine formaldehyde crosslinker is of formula (I):

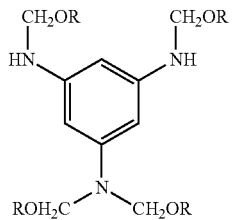

wherein R are each independently selected from C1 to C4 alkyl.

Embodiment 26. The method to coat a substrate of Embodiment 25, wherein R of the melamine formaldehyde crosslinker of formula (I) is methyl.

Embodiment 27. The method to coat a substrate of any one of Embodiments 13 to 26, wherein the resin having groups reactive with the melamine formaldehyde crosslinker comprises a polyol polymer selected from the group consisting of poly(meth)acrylatepolyols, polyesterpolyols, polyurethanepolyols or hybrid mixtures thereof.

Embodiment 28. The method to coat a substrate of any one of Embodiments 13 to 27, wherein the component of the 1K aqueous basecoat comprising at least one acid group is at least one selected from the group consisting of a water dispersible polyol polymer, an emulsifying resin, an anionic surfactant and an acid catalyst.

Embodiment 29. The method to coat a substrate of any one of Embodiments 13 to 28, wherein the resin having groups reactive with the crosslinker of the 1K aqueous basecoat further comprises at least one lateral carbamate functional group.

Embodiment 30. The method to coat a substrate of any one of Embodiments 13 to 29, further comprising: applying the 1K basecoat to a coating of a wet or partially dried aqueous primer.

Embodiment 31. A wet on wet multilayer coating on a substrate, comprising:
i) an aqueous base layer of a 1K basecoat composition, comprising: a melamine formaldehyde crosslinker; a resin having groups reactive with the crosslinker; and water; wherein a component of the basecoat composition comprises at least one acid group such that a multiplicity of acid groups is present in the 1K basecoat composition, the multiplicity of acid groups is at least partially neutralized with at least one organic amine component selected from the group consisting of a secondary amine and a formaldehyde condensate of the secondary amine, a pH of the composition is from 7.5 to 9.0, and a pKa of the formaldehyde condensate of the secondary amine is at least 8.0; and
ii) a solvent borne clear coat composition covering the base layer, comprising: a polyisocyanate; a hydroxy functional resin; and a solvent; wherein the aqueous basecoat layer comprises a urea reaction product of the secondary amine of the 1K basecoat and the polyisocyanate of the solvent borne clearcoat, the solvent borne clearcoat layer comprises a urea reaction product of the secondary amine of the 1K basecoat and the polyisocyanate of the solvent borne clearcoat, or both the aqueous basecoat layer and solvent clearcoat layer comprise a urea reaction product of the secondary amine of the 1K basecoat and the polyisocyanate of the solvent borne clearcoat.

Embodiment 32. The wet on wet multilayer coating of Embodiment 31, wherein the polyisocyanate component of the solventborne clear coat comprises an aliphatic polyisocyanate having from 2 to 6 isocyanate groups.

Embodiment 33. The wet on wet multilayer coating of Embodiments 31 or 32, wherein a partition coefficient at pH 8 of the secondary amine (log P) of the 1K aqueous basecoat is from 2.0 to −1.0.

Embodiment 34. The wet on wet multilayer coating of any one of Embodiments 31 to 33, wherein the multiple acid groups of the 1K aqueous basecoat comprise at least one of carboxylic acid groups phosphonic acid groups, organic ester phosphate acid groups and sulfonic acid groups.

Embodiment 35. The wet on wet multilayer coating of claim any one of Embodiments 31 to 34 wherein the secondary amine of the 1K aqueous basecoat comprises a cycloalkyl amine or a dialkyl amine of 7 carbons or less.

Embodiment 36. The wet on wet multilayer coating of any one of Embodiments 31 to 35, wherein the secondary amine is at least one of diethylamine, dipropylamine, diisopropylamine, piperidine and pyrrolidine.

Embodiment 37. The wet on wet multilayer coating of any one of Embodiments 31 to 36, wherein the melamine formaldehyde crosslinker comprises alkyl ether groups.

Embodiment 38. The wet on wet multilayer coating of any one of Embodiments 31 to 37, wherein the melamine formaldehyde crosslinker is of formula (I):

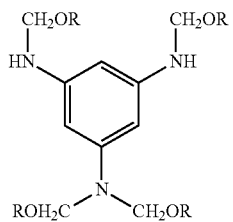

wherein R are each independently selected from C1 to C4 alkyl.

Embodiment 39. The wet on wet multilayer coating of Embodiment 38, wherein R of the melamine formaldehyde crosslinker of formula (I) is methyl.

Embodiment 40. The wet on wet multilayer coating of any one of Embodiments 31 to 39, wherein the resin having groups reactive with the melamine formaldehyde crosslinker comprises a polyol polymer selected from the group consisting of poly(meth)acrylatepolyols, polyesterpolyols, polyurethanepolyols or hybrid mixtures thereof.

Embodiment 41. The wet on wet multilayer coating of any one of Embodiments 31 to 40, wherein the component of the 1K aqueous basecoat comprising at least one acid group is at least one selected from the group consisting of a water dispersible polyol polymer, an emulsifying resin, an anionic surfactant and an acid catalyst.

Embodiment 42. The wet on wet multilayer coating of any one of Embodiments 31 to 41, wherein the resin having groups reactive with the crosslinker of the 1K aqueous basecoat further comprises at least one lateral carbamate functional group.

Embodiment 43. The wet on wet multilayer coating of any one of Embodiments 1 to 42, further comprising: a wet or partially dried aqueous primer coating on the substrate beneath the 1K basecoat layer.

Embodiment 44. A crosslinked multilayered coating obtained by curing and drying the multilayer coating of any one of Embodiments 31 to 43, comprising:

i) a base coat comprising a reaction product of the melamine formaldehyde crosslinker and the resin having acid groups and groups reactive to the melamine formaldehyde crosslinker; and ii) a clear coat comprising a reaction product of the hydroxy functional resin and the polyisocyanate crosslinker;

wherein the basecoat layer comprises a urea reaction product of the secondary amine of the 1K basecoat and the polyisocyanate of the clearcoat, the clearcoat layer comprises a urea reaction product of the organic amine of the 1K basecoat and the polyisocyanate of the clearcoat, or both the basecoat layer and clearcoat layer comprise a urea reaction product of the secondary amine of the 1K basecoat and the polyisocyanate of the clearcoat.

EXPERIMENTAL DESCRIPTION pH Measurement

To determine the pH of the samples a potentiometer was implemented to discern the difference in potential between two electrodes: one electrode consisting of a reference (Ag/AgCl) and the other a glass electrode that is sensitive to hydrogen ions that are contained in a single probe. The potentiometer and probe used were supplied by Oaktan (part number 35613-22). First the potentiometer is calibrated using standard solutions of known pHs. These standard solutions are at a pH of 7 and a pH of 10 and were supplied by Oaktan. After calibration, the potentiometer is cleaned with deionized water and dried, then placed into a sample, under agitation, approximately to a depth of three quarters of the potentiometer. Once the reading on the potentiometer has stabilized the reading is recorded to the tenth's place. Both calibration standards and all samples were brought to a temperature of 25° C. before measurement.

Polymer Molecular Weight Determination

To determine polymer molecular weights by GPC, fully dissolved molecules of a polymer sample are fractionated on a porous column stationary phase. A 0.1 mol/l acetic acid solution in tetrahydrofuran (THF) is used as the eluent solvent. The stationary phase is combination of Waters Styragel HR 5, HR 4, HR 3, and HR 2 columns. Five milligrams of sample are added to 1.5 mL of eluent solvent and filtered through a 0.5 μm filter. After filtering, 100 μl of the polymer sample solution is injected into the column at a flow rate of 1.0 ml/min. Separation takes place according to the size of the polymer coils which form in the eluent solvent. Small molecules diffuse into the pores of the column material more frequently and are therefore retarded more than large molecules. Thus, large molecules are eluted earlier than small molecules. The molecular weight distribution, the averages $M_n$ and $M_w$ and the polydispersity $M_w/M_n$ of the polymer samples are calculated with the aid of chromatography software utilizing a calibration curve generated with the EasyValid validation kit which includes a series of unbranched-polystyrene standards of varied molecular weights available from Polymer Standards Service.

Example I

Aqueous 1K coating compositions containing a conventional water dispersible poly(meth)acrylate polyol resin and hexamethoxymethyl melamine (HMMM) as crosslinker in water were prepared with salting (neutralization) of the carboxyl acid groups with each of 2-amino-2-methyl-1-propanol (AMP), N,N-dimethylethanolamine (DMEOA) and diethylamine (DEA). The formulation for the composition is shown in Table I where the % values show % by weight of the total basecoat composition. In making the composition, the 3.3% Polyester resin was first mixed with the butylglycol, Hydrolan® 2156 and amine and then added to the mixture of the other components.

TABLE I

| Basecoat Examples 1-3* | |
|---|---|
| wt. % | Component |
| 18.8% | 3.5% Laponite ® RD in water |
| 5.6% | DI water |
| 12.1% | Polyurethane dispersion (1) |
| 5.9% | Resimene ® HM2608 |
| 1.3% | Polyester resin (2) |
| 0.1% | amine* |
| 3.4% | dipropyleneglycol propyl ether |
| 17.6% | Polyurethane-acrylic dispersion (3) |
| 1.2% | ethylhexanol |
| 1.0% | Pluracol ® P1010 |
| 0.2% | Rheovis ® PU1250 |
| 10.9% | 10% Rheovis ® AS1130/90% DI water |

TABLE I-continued

Basecoat Examples 1-3*

| wt. % | Component |
|---|---|
| 0.2% | amine* |
| 0.4% | BYK ®347 |
| 0.3% | Tinuvin ® 1130 |
| 3.3% | Polyester resin (2) |
| 6.5% | butylglycol |
| 8.3% | Hydrolan ® 2156 |
| 0.2% | amine* (Adjust pH to 8.2-8.3) |
| 2.7% | DI water |

*for DMEOA and AMP, the amounts shown were added. For diethylamine, 82% of this amount by weight was added to yield the same equivalents.
(1) Resin prepared as example B of U.S. Pat. No. 6,001,915
(2) Resin prepared as example A of U.S. Pat. No. 6,001,915 except dimethylethanolamine was withheld
(3) Resin prepared as example D of U.S. Pat. No. 6,001,915
Laponite ® RD and Hydrolan ® 2156 are available from Altana
Pluracol ® P1010, Tinuvin ® 1130, Rheovis ® PU1250 and Rheovis ® AS1130 are available from BASF
Resimene ® HM2608 is available from Ineos The pH of each basecoat composition was measured (7.5-9) at initial formulation and after 8 weeks of storage at ambient temperature. The change in pH after 8 weeks is shown in Table II.

TABLE II

| Example | Neutralization amine | pH change after 8 weeks storage |
|---|---|---|
| 1 (Comparative) | DMEOA | <0.2 |
| 2 (Comparative) | AMP | −0.6 |
| 3 (Invention) | DEA | <0.2 |

DMEOA—N,N-dimethylethanolamine (tertiary amine; pKa = 9.2; not reactive with polyisocyanate or formaldehyde)
AMP—2-amino-2-methyl-1-propanol (primary amine; pKa = 9.8; pKa of the methylol adduct with two mole of formaldehyde = 5.68)
DEA—diethylamine (secondary amine; pKa = 10.8; pKa of the methylol adduct of diethylamine and one mole of formaldehyde = 8.9).

Each of the 1K basecoat compositions were applied to a primed substrate and flash dried in an air flow oven for 5 minutes at an oven zone temperature of 90° C. A conventional 2K solvent borne clear coat of the formulation shown in Table III was then applied and the wet on wet two layer coating cured in a bake oven at 80° C. The cured coating was then observed for the formation of blisters after a watersoak of 10 days at 40° C. with the results shown in Table IV.

TABLE III

| | Clearcoat |
|---|---|
| wt. % | Component |
| 60.2% | Acrylic resin (4) |
| 3.9% | cyclohexanone |
| 2.7% | ethyleneglycol butylether acetate |
| 4.0% | Aromatic S100 |
| 1.9% | Aromatic S200 |
| 21.7% | Setal ® 82166 (5) |
| 0.1% | Baysilone ® OL-17 |
| 0.02% | Baysilone ® OL-44 |
| 2.7% | xylene |
| 1.0% | Tinuvin ® 292 |
| 1.0% | Tinuvin ® 1130 |
| 0.5% | Irganox ® 1010 |
| 0.01% | dibutyltin dilaurate |
| 0.01% | Flowlen ® AC300 |
| 0.3% | butylacetate |
| 22.7% | Desmodur ® N-75 |

(4) 54% solids acrylic resin with OH value of 131 mgKOH/g solids, theoretical Tg of 42C and Mw 4500 Daltons
(5) 64% solids dispersion of urea crystals in polyester resin from Allnex resins
Baysilone ® OL-17 and Baysilone ® OL-44 are available from OMG Corp.
Tinuvin ® 292, Tinuvin ® 1130 and Irganox ® 1010 are available from BASF Corp.
Flowlen ® AC300 is available from Kyoisha.
Desmodur ® N-75 is available from Covestro

TABLE IV

Basecoat Examples 1-3 with 2K Clearcoat

| Example | Neutralization amine | Post Watersoak blisters (80° C. bake) |
|---|---|---|
| 1 (Comparative) | DMEOA | Fail |
| 2 (Comparative) | AMP | Pass |
| 3 (Invention) | DEA | Pass |

As indicated, only the DEA shows pH stability on storage and good post watersoak blister performance. This combination of pH stability and watersoak performance was unexpected and offers significant advantage over conventionally known melamine based formulations.

Example II

Silver metallic waterborne basecoats were prepared according the Basecoats of Example I with amine neutralization as indicated in examples 1-6:

| | 1 | 2 | 3 | 4 | 5 | 6 |
|---|---|---|---|---|---|---|
| Basecoat Example 1 - neutralized with DMEA | 100.00 | 0.00 | 0.00 | 100.00 | 0.00 | 0.00 |
| Basecoat Example 2 - neutralized with AMP-95 | 0.00 | 100.00 | 0.00 | 0.00 | 100.00 | 0.00 |
| Basecoat Example 3 - neutralized with DEA | 0.00 | 0.00 | 100.00 | 0.00 | 0.00 | 100.00 |
| Dioctyltin Dilaurate* | 0.00 | 0.00 | 0.00 | 3.00 | 3.00 | 3.00 |
| Total | 100.00 | 100.00 | 100.00 | 103.00 | 103.00 | 103.00 |

*dioctyltin dilaurate is available from Santa Cruz Biotechnology, Inc.

One-component solventborne clearcoats were prepared according to the examples 1 and 2 as follows:

| | 1 | 2 |
|---|---|---|
| OH Acrylic Resin* | 25.63 | 25.63 |
| Flownon SH-290** | 0.91 | 0.91 |
| Blocked Aliphatic Polyisocyanate Resin*** | 44.43 | 44.43 |
| Tinuvin 384-B**** | 0.78 | 0.78 |
| Tinuvin 123***** | 0.65 | 0.65 |
| Byk-325^x | 0.18 | 0.18 |
| Lindron 22^xx | 0.15 | 0.15 |
| Fascat 4200^xxx | 0.92 | 0.00 |

-continued

|  | 1 | 2 |
|---|---|---|
| 18% Solution of Paratoluene Sulfonic Acid in n-Butanol | 0.00 | 0.00 |
| Solvesso 100xxxx | 27.27 | 27.27 |
| Total | 100.92 | 100.00 |

*Acrylic Resin: $T_g$ = 38° C.; $M_w$ = 6400; NVM = 63%; OH equivalent weight = 300
**Flownon SH-290 is a polyamide wax available from Kyoeisha Chemical Co., Ltd
***Blocked Aliphatic Polyisocyanate Resin: NVM = 60%; NCO equivalent weight = 400
****Tinuvin 384-B is a UV absorber available from BASF Corporation
*****Tinuvin 123 is a hindered amine light stabilizer available from BASF Corporation
xByk-325 is a silicone flow additive available from BYK Chemie
xxLindron 22 is a polyacrylate flow additive available from Lindau Chemicals, Inc.
xxxFascat 4200 is a tin catalyst (dibutyltin diacetate) available from PMC Organometallix
xxxxSolvesso 100 is a mixture of aromatic solvents available from ExxonMobil Chemical Cold rolled steel panels were obtained from ACT Test Panels, LLC. They were coated with Cathoguard© 800 electrocoat and U28AW110 solventborne primer (both available from BASF). Basecoat examples 1-6 were applied to the test panels at a dry film thickness of 0.5-0.7 mils and force-flashed for 5 minutes at 60° C. Clearcoat examples 1 and 2 were applied to the basecoated panels at a dry film thickness of 1.8-2.0 mils and baked at 110° C. (metal temperature) for 20 minutes. After 24 hours, the clearcoated panels were immersed in a water bath for 10-days at 38° C. according to ASTM D870. Upon removal from the bath, panels were evaluated for blistering and adhesion. The evaluation results are listed in the following Table.

| Example | A | B | C | D | E | F |
|---|---|---|---|---|---|---|
| Basecoat Example | 1 | 2 | 3 | 4 | 5 | 6 |
| Clearcoat Example | 1 | 1 | 1 | 2 | 2 | 2 |
| Blister Rating* | Medium 8 | Few 8 | 10 | Medium 8 | 10 | 10 |
| Adhesion** | 2B | 3B | 3B | 5B | 5B | 5B |

*Blistering rated according to ASTM D 714 Degree of Blistering of Paints. Size of blisters are evaluated on a scale of 2-10 with 2 being large blisters and 8 small blisters; 10 being no blisters; frequency of blisters graded as Dense, Medium-Dense, Medium, and Few.
**Adhesion rated according to ASTM D3359 Method B (crosshatch method) where rating 2B indicates 15-35% removal; 3B indicates 5-15% removal and 5B indicates no loss of crosshatch units from the coating.

As indicated, the Examples according to the present invention (C and F) show no water blistering and good adhesion performance. The significant improvement in water blistering resistance with 1K basecoats according to the present invention was surprising and could not have been predicted.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A method to coat a substrate, comprising:
    coating a surface of the substrate with a 1K aqueous coating composition comprising
        a melamine formaldehyde crosslinker;
        a resin having groups reactive with the crosslinker; and
        water;
    wherein a component of the basecoat composition comprises at least one acid group such that a multiplicity of acid groups is present in the 1K basecoat composition,
    the multiplicity of acid groups is at least partially neutralized with at least one organic amine component comprising a formaldehyde condensate of a secondary amine,
    a pH of the composition is from 7.5 to 9.0, and
    a pKa of the formaldehyde condensate of the secondary amine is at least 8.0, to obtain a basecoat;
    at least partially drying the basecoat;
    applying a solvent borne isocyanate clear coat composition to the at least partially dried basecoat to obtain a wet on wet coating of the basecoat layer and the clear coat layer;
    drying and curing the dual coating at a temperature of from ambient temperature to 110° C.;
    wherein the solventborne isocyanate clear coat composition comprises a polyisocyanate crosslinker.

2. The method to coat a substrate of claim 1, wherein the solventborne clear coat is a two component (2K) composition comprising an unblocked polyisocyanate crosslinker.

3. The method to coat a substrate of claim 1, wherein the solventborne clear coat is a one component (1K) composition comprising a blocked polyisocyanate crosslinker.

4. The method to coat a substrate of claim 1, further comprising:
    applying the 1K basecoat to a coating of a wet or partially dried aqueous primer.

* * * * *